United States Patent [19]

Saito et al.

[11] Patent Number: 5,000,546
[45] Date of Patent: Mar. 19, 1991

[54] OPTICAL DEVICE WITH OPTICAL POLARIZER/ANALYZER FORMED OF YTTRIUM VANADATE

[75] Inventors: Seiichi Saito; Yasuhiko Kuwano, both of Tokyo, Japan

[73] Assignee: NEC Corporation, Japan

[21] Appl. No.: 420,831

[22] Filed: Oct. 12, 1989

[30] Foreign Application Priority Data

Oct. 13, 1988 [JP] Japan .................. 63-258603
Oct. 13, 1988 [JP] Japan .................. 63-258604

[51] Int. Cl.$^5$ .................. G02F 1/09; G02B 1/08; G02B 5/30
[52] U.S. Cl. .................. 350/378; 350/401; 350/402; 350/403
[58] Field of Search ........... 350/375, 376, 377, 378, 350/390, 395, 402, 401, 403

[56] References Cited

U.S. PATENT DOCUMENTS

| | | | |
|---|---|---|---|
| 3,700,308 | 10/1972 | Nicolai | 350/402 |
| 3,914,018 | 10/1975 | DeShazer | 350/402 |
| 3,989,352 | 11/1976 | Lacklison et al. | 350/376 |
| 4,027,948 | 6/1977 | Tanton et al. | 350/378 |
| 4,198,123 | 4/1980 | Kremen | 350/402 |
| 4,449,096 | 5/1984 | Doriath et al. | 350/377 |
| 4,755,026 | 7/1988 | Honda et al. | 350/376 |

FOREIGN PATENT DOCUMENTS 63-069325 5/1988 Japan .

*Primary Examiner*—Bruce Y. Arnold
*Assistant Examiner*—Martin Lerner
*Attorney, Agent, or Firm*—Leydig, Voit & Mayer

[57] ABSTRACT

An optical polarizer/analyzer incorporated in an optical device is formed of an yttrium vanadate represented by the molecular formula of $YVO_4$, the yttrium vanadate is as large in differential refractive index between an ordinary ray and an extraordinary ray and in optical absorption characteristics as rutile but is smaller in invertion loss than rutile at 1.3 micron wavelength and the yttrium vanadate is easy for producing a rod with a large diameter, so that the optical polarizer/analyzer of the yttrium vanadate is suitable for the component element of an optical device.

8 Claims, 3 Drawing Sheets

OPTICAL DEVICE WITH OPTICAL POLARIZER/ANALYZER FORMED OF YTTRIUM VANADATE

FIELD OF THE INVENTION

This invention relates to an optical polarizer/analyzer incorporated in an optical device such as, for example, an optical isolator and, more particularly, to a material used for formation of the optical polarizer/analyzer.

DESCRIPTION OF THE RELATED ART

Various kinds of optical devices are incorporated in optical fiber transmission systems. Often such optical devices are associated with optical isolators to prevent reflections of optical radiation from the device.

Optical isolators often have a structure where a Faraday element is sandwiched between an optical polarizer and an optical analyzer, all being encircled with a permanent magnet. The optical polarizer/analyzer and the Faraday element are formed of single crystal rutile (represented by the molecular formula of $TiO_2$) and bismuth garnet, respectively. The rutile wafers and bismuth garnet wafer are first prepared and then the rutile wafers are fixed to both surfaces of the bismuth garnet wafer, respectively. The multi-wafer structure thus formed is cut into a plurality of chips. The chip size ranges between 1 square millimeter to many square millimeters. These chips provide essential parts of the optical isolators.

A significant problem is encountered in the prior art fabrication process which effects the productivity and the production yield. In detail, the rutile wafer is sliced from an artificially produced rutile bulk. The Verneuil method and the floating zone method are well known as rutile crystal growing materials. Rutile rod produced through each of these methods ranges from about 12 millimeters to about 15 millimeters in the diameter. In general, the maximum achievable diameter is determined by the weight of the molten rutile and the surface tension. These factors generally restrict the diameter of the rutile rod to the above range. On the other hand, bismuth garnet wafer of about 35 millimeters to about 50 millimeters in the diameter is commercially available. Such large bismuth garnet wafer, however, cannot be effectively utilized for production of an optical isolator due to size restriction of the small calcite wafer. Use of a small bismuth garnet wafer corresponding to the calcite wafer size decreases the productivity of the optical isolator. Moreover, various defects often are present in the calcite crystal. Poor quality calcite crystal results in deterioration in the production yield of the optical isolator. The reduced productivity and production yield result in increased production cost, and, ultimately higher costs for optical isolators.

Natural calcite is used, alternatively for formation of the polarizer/analyzer; however, there is limited availability of high quality natural calcite to meet industrial demand. Moreover, most of the calcite ore has such a small diameter and is not chemically stable so that it is not employable for fabrication of large devices. When chemically unstable calcite is used for the polarizer/analyzer, the polarizer/analyzer tends to be degraded, and, accordingly, the optical isolator performance characteristics deteriorate after a relatively short duration.

For these reasons, the natural calcite is not desirable for industrial fabrication of the optical isolator.

SUMMARY OF THE INVENTION

It is therefore an important object of the present invention to provide an optical device which is easily fabricated.

It is also an important object of the present invention to provide an optical device which is relatively low in the production cost.

To accomplish these objects, the present invention proposes to form an optical polarizer of an yttrium vanadate.

In accordance with one aspect of the present invention, there is provided an optical device comprising an optical polarizer formed of an yttrium vanadate represented by the molecular formula of $YVO_4$.

In accordance with another aspect of the present invention, there is provided an optical device serving as an optical isolator, comprising a Faraday element operative to cause a plane of polarization to rotate over a predetermined angle, which is sandwiched between an optical polarizer and an optical analyzer, and a magnet provided in association with the Faraday element, in which the optical polarizer and the optical analyzer are formed of an yttrium vanadate represented by the molecular formula of $YVO_4$.

BRIEF DESCRIPTION OF THE DRAWINGS

The features and advantages of an optical device according to the present invention will be more clearly understood from the following description taken in conjunction with the accompanying drawings, in which.

DESCRIPTION OF THE PREFERRED EMBODIMENTS

First embodiment

Figure 1:
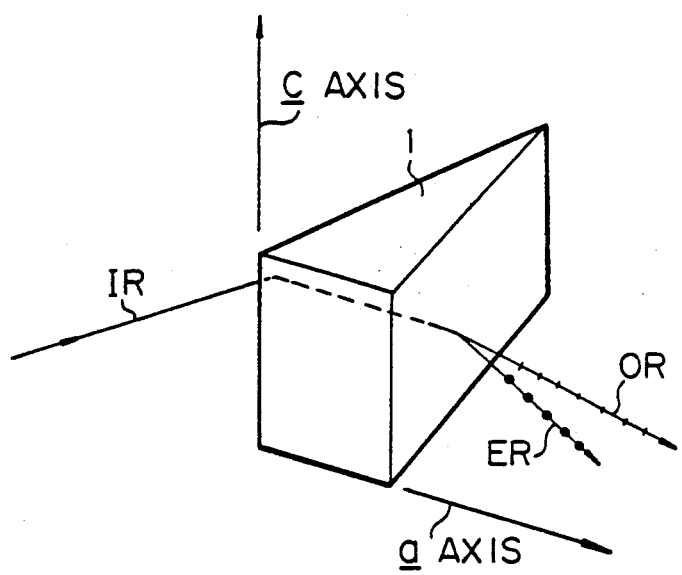
FIG. 1 is a perspective view depicting an optical polarizer embodying the present invention.
Figure 2:
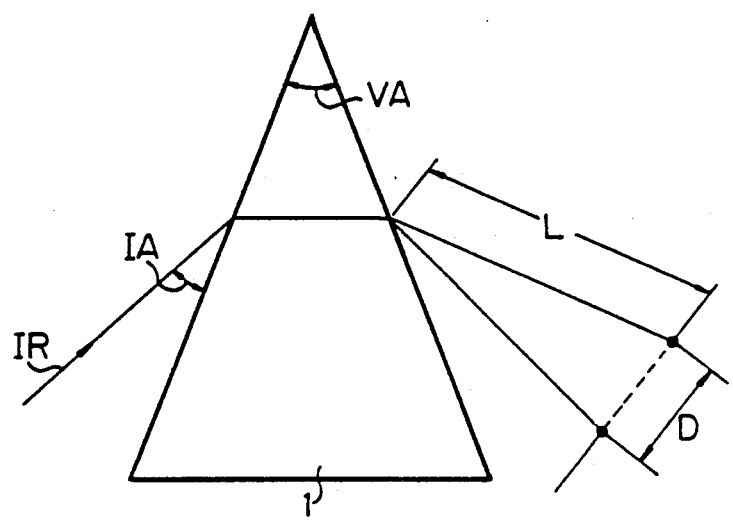
FIG. 2 is a plan view of the optical polarizer of FIG. 1.

Referring first to FIGS. 1 and 2 of the drawings, an optical polarizer according to the present invention is formed of single crystal yttrium vanadate, represented by the molecular formula of $YVO_4$, and is shaped into a trigonal prism. The trigonal prism is arranged in such a manner that the crossing two side lines of the bottom plane are aligned with the a and c axes of the crystal structure of the yttrium vanadate. The vertical angle VA of the trigonal prism is adjusted to about 30 degrees. The optical polarizer thus formed serves as an optical separator or a prism 1.

The optical polarizer shown in FIG. 1 is made from a single crystal yttrium vanadate bulk which is grown through a pulling method proposed by the inventors of the present invention in Japanese Patent Application No. 63-69325. Since the single crystal yttrium vanadate is grown in the single axis tetragonal system, the difference in refractive index between an ordinary ray and an extraordinary ray is maximized in a direction parallel to the a axis of the crystal structure. According to measurements carried out by the inventors, the difference in the refractive index between the ordinary ray and the extraordinary ray is equal to or greater than about 0.2 in the range from the visual region to the infrared region. The extraordinary ray is polarized to the c axis of the crystal structure and the ordinary ray has linear polarizing characteristics substantially perpendicular with respect to the extraordinary ray. Moreover, the yttrium vanadate is easily shaped into various configurations and is chemically stable. For this reason, the yttrium vanadate is suitable for providing a component element of an optical device.

When an optical radiation IR is obliquely directed onto a side plane of the prism 1, as it passes through prism 1, the optical radiation is separated into an ordinary ray OR and an extraordinary ray ER. In accordance with the polarizing characteristics of the yttrium vanadate described hereinbefore, the extraordinary ray ER is polarized to the c axis of the crystal structure and the ordinary ray OR is polarized in a perpendicular direction to the extraordinary ray ER. Assuming now that the incident angle IA of the optical radiation is about 60 degrees relative to the a axis, the ordinary ray OR and extraordinary ray ER are separated by a distance D (about 2 centimeters) at a distance (L) from the prism 1 of about 10 centimeters. Thus, the rays are widely separated, and the prism 1 is valuable for the optical device.

Second embodiment

Figure 3:
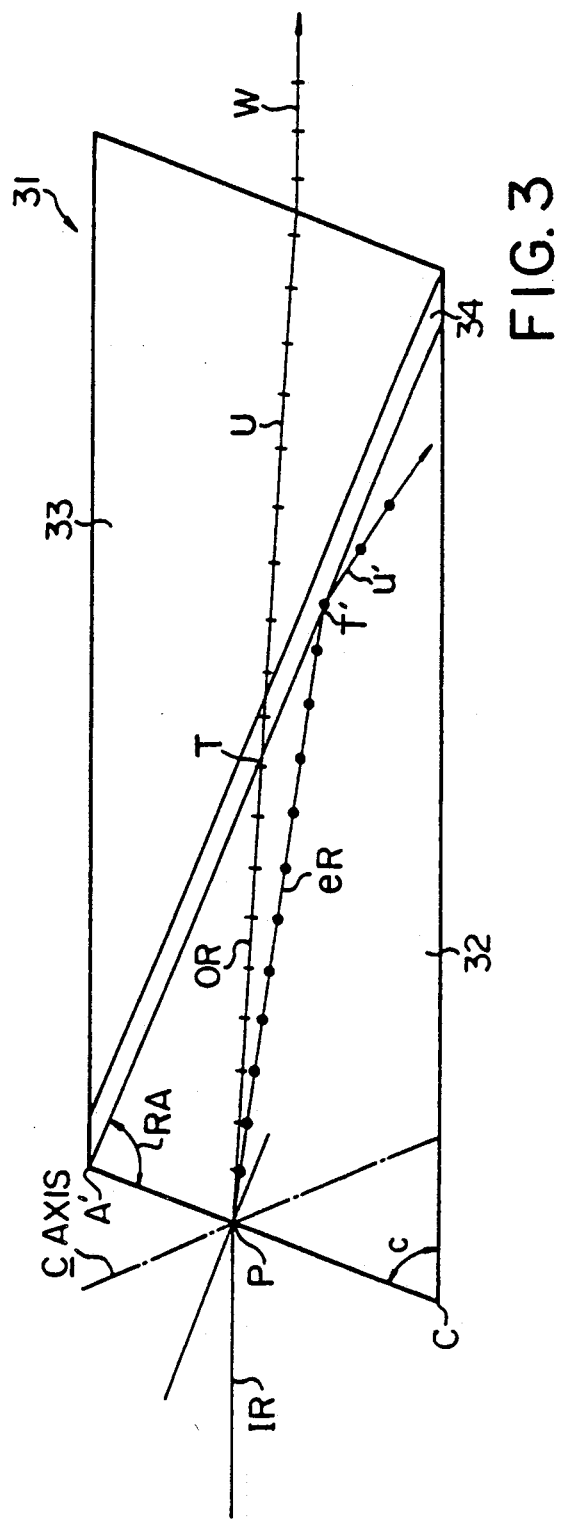
FIG. 3 is an optical device provided with two optical polarizers serving as an optical polarizing prism.

Turning to FIG. 3 of the drawings, a polarizing prism 31 embodying the present invention comprises two prisms 32 and 33 formed of the yttrium vanadate (YVO$_4$) and a thin film 34 of Canada balsam sandwiched between the two prisms 32 and 33. Each of the prisms 32 and 33 define right triangles (RA,=90°) and an angle C is about 70 degrees.

The polarizing prism 31 is skewed from the c axis of the crystal structure so that the angle of intersection of line CA' is about 30 degrees. When a non-polarized incident ray IR impinges onto the point P of the prism 2, the incident ray IR is polarized in the prism 2, and, accordingly, an ordinary ray OR and an extraordinary ray ER are formed. The extraordinary ray ER is totally reflected at point T' of the thin film 34, and proceeds in a direction indicated by ray U'. On the other hand, the ordinary ray OR is incident at point T of the thin film 34, passes through the thin film 34, proceeds to a direction indicated by U, and exits the prism 33 as indicated by W.

Third embodiment

Figure 4:
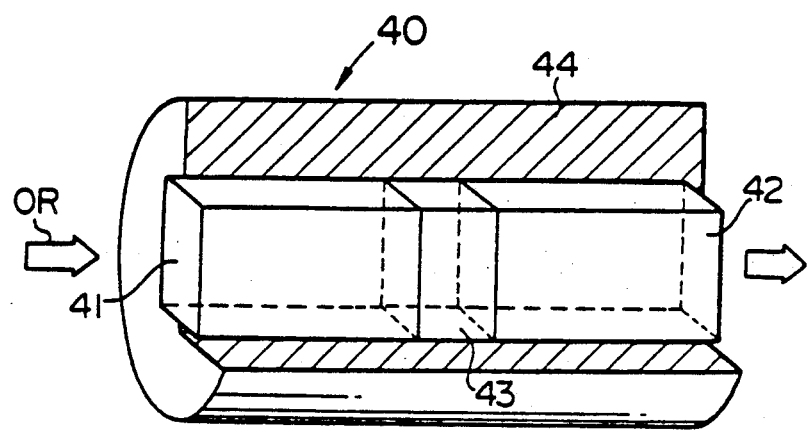
FIG. 4 is a partially cut-away perspective view illustrating an optical isolator embodying the present invention.
Figure 5:
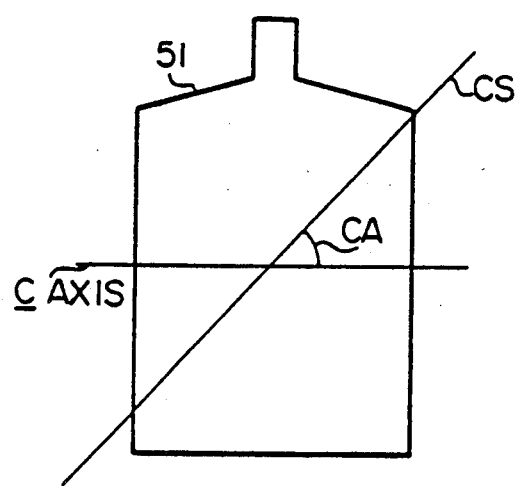
FIG. 5 is a side view of an yttrium vanadate rod for producing an yttrium vanadate wafer used in a fabricating process of an optical polarizer/analyzer according to the present invention.

Turning to FIG. 4, an optical isolator 40 embodying the present invention largely comprises an optical polarizer 41 formed of yttrium vanadate, an optical analyzer 42 formed of the yttrium vanadate, a Faraday element 43 of bismuth garnet sandwiched between the optical polarizer 41 and the optical analyzer 42, and a magnet 44 shaped into a tube configuration where the optical polarizer 41, the optical analyzer 42 and the Faraday element 43 are accommodated. In this instance, each of the optical polarizer 41 and the optical analyzer 42 is shaped into a cube of 1.2 millimeter, and the Faraday element is about 0.22 millimeter in thickness. The Faraday element 43 induces rotation of the plane of polarization over 45 degrees. The Faraday element characteristics are well known to the skilled artisan, so that no further description is incorporated.

When an optical radiation OR is directed onto the optical isolator 40, the incident ray passes through the optical isolator. However, the optical isolator 40 prevents undesirable reflections in the direction opposite to the optical radiation. According to experimental results, the yttrium vanadate used for the optical polarizer 41 and the optical analyzer 42 has a differential refractive index between an ordinary ray and an extraordinary ray is measured to be about 0.207 at 1.1 micron wavelength. The insertion loss is about 0.29 dB at 1.3 micron wavelength which compares favorably against the larger insertion loss of rutile which exhibits insertion loss of about 0.52 dB at 1.3 micron wavelength. The isolation of the yttrium vanadate is as large as rutile, and is measured to be about 36 dB. The yttrium vanadate crystal is considered to be not less than about 40 dB in isolation. This large value may be attributable to the measuring system.

Description is hereinunder made for a process of fabricating the optical isolator. The process starts with preparing a pulling system associated with a high frequency induction heating unit (not illustrated). An Iridium crucible of about 50 millimeters in diameter, about 50 millimeters in depth and about 1.5 millimeter in thickness, is filled with 500 grams of the yttrium vanadate (YVO$_4$) powder. The powder is heated until melted and a small seed crystal with the c axis orientation is dipped into the molten yttrium vanadate. The seed crystal is lifted at a rate of about 2 to 3 millimeters per hour, and the temperature of the molten yttrium vanadate is decreased at a rate of about 20° to 25° C. per hour. After about 10 hours, the yttrium vanadate bulk 51 is separated from the molten yttrium vanadate, and gradually cooled at about 50° to 70° C. until the crucible reaches about 800° C. The yttrium vanadate bulk 51 which is about 25 millimeters in diameter and about 35 millimeters in length, is then cooled to room temperature.

The yttrium vanadate bulk 51 is then sliced along a cutting surface CS to produce wafers of about 1.3-1.4 millimeter thickness. The cutting angle CA is inclined from the c axis of the crystal toward the a axis if the crystal by about 45 degrees. The preferred range of the cutting angle CA is between 43° to 53°. The cutting angle is varied to produce various kinds of wafer. The wafers are polished to have final thicknesses of about 1.2 millimeter, and then subject to optical properties evaluation.

The yttrium vanadate wafers thus produced are covered on both sides with anti-reflection films for 1.3 micron wavelength. A bismuth garnet film is sandwiched between the two covered yttrium vanadate wafers, and the laminated structure is cut into a large number of chips. These chips provide essential component elements of the optical isolator 40. After the completion of the fabricating process, the optical isolator is evaluated for the isolation and the insertion loss, as described hereinbefore.

In the foregoing, the crucible used in the process is about 50 millimeters in diameter. However, it is possible to use a larger crucible. When a larger crucible is used, a larger bulk is grown, and, accordingly, a larger wafer is produced from the larger bulk.

As will be understood from the foregoing description, the yttrium vanadate is grown to a large bulk, and, for this reason, the optical isolator with the optical polarizer/analyzer of the yttrium vanadate is easily produced, improves productivity, and correspondingly reduces production cost. Since the yttrium vanadate is both of high quality and chemically stable, the production yield is increased and prolongs the service time period of a polarizer employed in optical device 40.

Although particular embodiments of the present invention have been shown and described, it will be obvious to those skilled in the art that various changes and modifications may be made without departing from the spirit and scope of the present invention.

What is claimed is:

1. An optical device serving as an optical isolator, comprising a Faraday element operative to cause a plane of polarization to rotate over a predetermined angle and sandwiched between an optical polarizer and an optical analyzer, and a magnet provided in association with said Faraday element, in which said optical polarizer and said optical analyzer are formed of high quality, chemically stable, single crystal yttrium vanadate grown through a pulling method and represented by the molecular formula of $YVO_4$.

2. An optical device as set forth in claim 1, in which said Faraday element is formed of bismuth garnet.

3. An optical device as set forth in claim 1, in which each of said optical polarizer and said optical analyzer is shaped into a cube of about 1.2 millimeter.

4. An optical device as set forth in claim 1, in which said Faraday element is about 0.22 millimeter in thickness.

5. An optical device as set forth in claim 1 where the yttrium vanadate crystal is cut at an inclined angle of 43°–53° relative to the crystal's c axis.

6. An optical device as set forth in claim 5 where the optical polarizer and analyzer exhibit a refractive index differential between an ordinary and extraordinary rays of about 0.207 at 1.1 micron wavelength.

7. An optical device serving as an optical isolator, comprising a Faraday element operative to cause a plane of polarization to rotate over a predetermined angle and sandwiched between an optical polarizer and an optical analyzer, and a magnet provided in association with said Faraday element, in which said optical polarizer and said optical analyzer are formed of high quality, chemically stable, single tetragonal crystal yttrium vanadate grown through a pulling method and represented by the molecular formula of $YVO_4$, and in which each of said Faraday element, said optical polarizer and said optical analyzer are shaped into a cube, wherein said magnet is shaped into a tube member for accommodating said Faraday element, said optical polarizer and said optical analyzer.

8. An optical device including a cut and polished crystal yttrium vanadate formed from the process of:
   (a) melting yttrium vanadate powder in an appropriate crucible of selected diameter,
   (b) dipping a seed crystal in the direction of its crystalline c axis into the molten yttrium vanadate,
   (c) lifting the seed crystal at a rate of about 2–3 millimeters per hour to pull yttrium vanadate from the crucible,
   (d) decreasing the temperature of the pulled yttrium vanadate at a rate of about 20°–25° C. per hour,
   (e) separating the resulting yttrium vanadate bulk from the crucible,
   (f) cooling the yttrium vanadate bulk, and
   (g) cutting and polishing the yttrium vanadate bulk.

* * * * *